(12) United States Patent
Kodialam et al.

(10) Patent No.: US 7,633,867 B2
(45) Date of Patent: Dec. 15, 2009

(54) CAPACITY ALLOCATION FOR NETWORKS HAVING PATH LENGTH ROUTING CONSTRAINTS

(75) Inventors: Muralidharan S. Kodialam, Marlboro, NJ (US); Tirunell V. Lakshman, Morganville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1405 days.

(21) Appl. No.: 10/357,557

(22) Filed: Feb. 4, 2003

(65) Prior Publication Data

US 2003/0227924 A1    Dec. 11, 2003

Related U.S. Application Data

(60) Provisional application No. 60/387,533, filed on Jun. 10, 2002.

(51) Int. Cl.
*G01R 31/08* (2006.01)
(52) U.S. Cl. .......................... 370/231; 370/235; 370/236
(58) Field of Classification Search ................. 370/231, 370/235, 236
See application file for complete search history.

(56) References Cited

U.S. PATENT DOCUMENTS

| | | | |
|---|---|---|---|
| 5,546,542 A * | 8/1996 | Cosares et al. | 709/241 |
| 5,940,372 A * | 8/1999 | Bertin et al. | 370/238 |
| 6,538,991 B1 * | 3/2003 | Kodialam et al. | 370/229 |
| 7,263,100 B2 * | 8/2007 | Hauser et al. | 370/395.41 |
| 2006/0051090 A1 * | 3/2006 | Saniee et al. | 398/59 |

OTHER PUBLICATIONS

"Faster and Simpler Algorithms for Multicommodity Flow and other Fractional Packing Problems" by Naveen Garg and Jochen Könemann, 1998, pp. 1-10.
"A Simple Efficient Approximation Scheme for the Restricted Shortest Path Problem" by Dean H. Lorenz and Danny Raz, 1999, pp. 1-10.

* cited by examiner

*Primary Examiner*—Jason E Mattis
(74) *Attorney, Agent, or Firm*—Mendelsohn, Drucker & Associates, P.C.

(57) ABSTRACT

Capacity design of an optical network for demands of connections forms a linear programming sizing problem for a optimal routing. A dual of the linear programming sizing problem is formed and solved with an approximation algorithm. Edge lengths are initialized based on i) the inverse of the edge's capacity and ii) a scalar constant. Then, the approximation algorithm proceeds in phases to route each commodity over the edges of a graph. During each phase, the demand's flow is sent from the source to destination via multiple iterations. During each iteration, the shortest length-bounded path from the source to the destination is determined, a portion of the flow is sent, and the lengths of the edges that carry the flow are updated. The value employed to scale the network is generated after the last phase from the maximum ratio of edge flow to edge capacity.

13 Claims, 1 Drawing Sheet

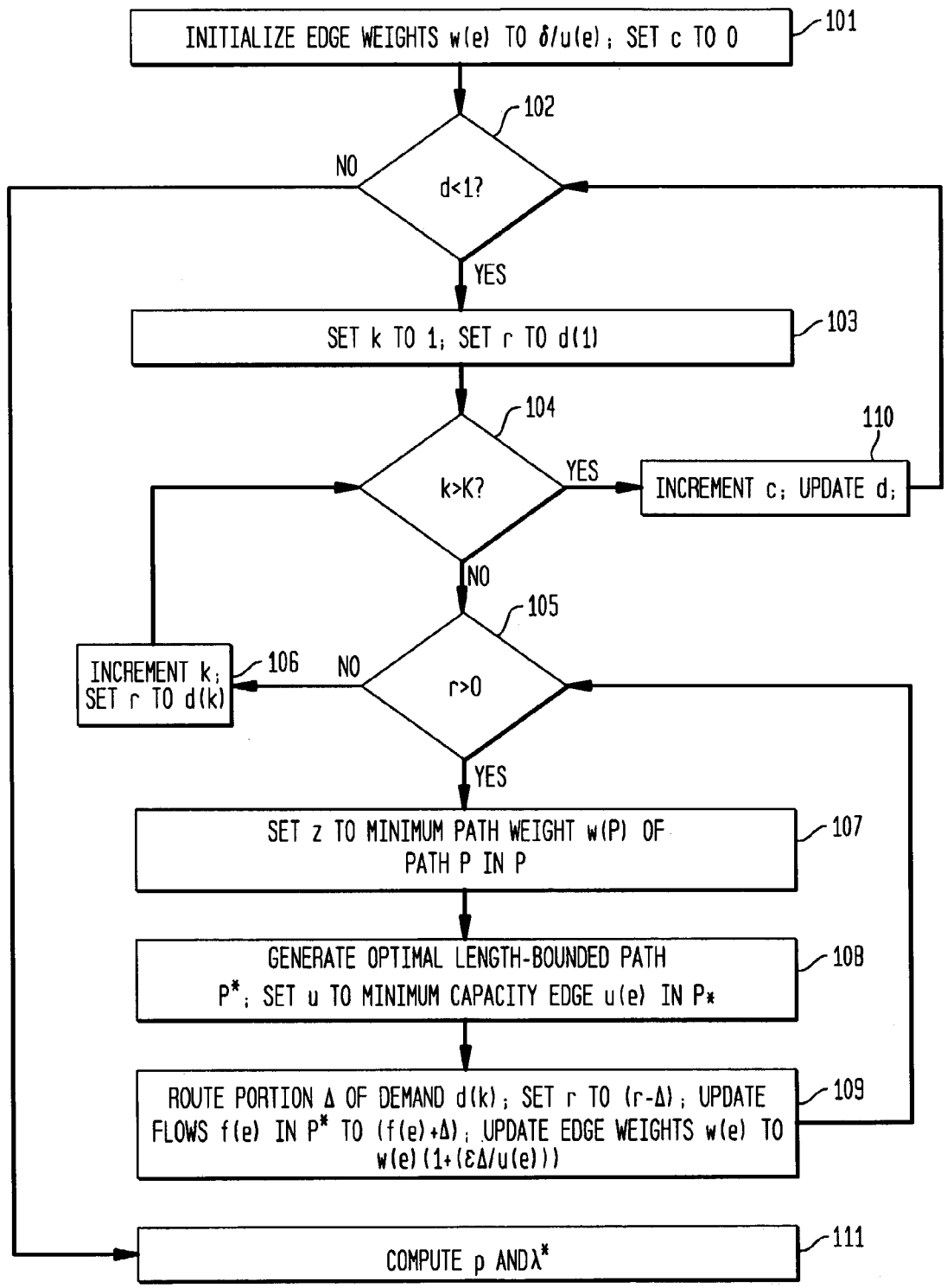

CAPACITY ALLOCATION FOR NETWORKS HAVING PATH LENGTH ROUTING CONSTRAINTS

CROSS-REFERENCE TO RELATED APPLICATIONS

This application claims the benefit of the filing date of U.S. provisional application No. 60/387,533, filed on Jun. 10, 2002.

This application is related to U.S. patent application Ser. No. 10/357,559 filed on Feb. 04, 2003, the teachings of which are incorporated herein by reference.

BACKGROUND OF THE INVENTION

1. Field of the Invention

The present invention relates to routing connections in a telecommunications network, and, more particularly, to capacity allocation for paths through nodes of the network when path lengths are constrained.

2. Description of the Related Art

In interconnected communications networks, users establish connections between a source node and a destination node with a stream of data that is transferred through the network over a network path. The data of one or more connections constitutes traffic over the network. Optical networks are typically characterized by a set of micro-mechanical optical switches (i.e., nodes) connected via optical links. Packet networks (which may be implemented using optical networks) are typically characterized by routers (also considered nodes) interconnected by electrical or optical links. A network path for a connection between a given source-destination (node) pair is defined by a set of nodes (the source and destination node pair and any intermediate nodes) interconnected by a set of links coupled to the nodes carrying the data stream, or flow, of the connection.

Capacity allocation in networks assigns traffic of connections to certain paths through the network based on the capacity of network nodes and links. For example, such capacity may be the number of connections supported at input or output interfaces of the node, or may be bandwidth of a link. In addition, Quality of Service (QoS) guarantees, such as minimum delay, packet loss, or bandwidth guarantees, may be accounted for with an effective bandwidth of the packet loss, or bandwidth guarantees, may be accounted for with an effective bandwidth of the links. For capacity allocation and provisioning purposes, the amount of traffic that may be routed between sources and destinations in a given network is desirably determined based on some method that optimizes the available capacity for the network while meeting QoS requirements of the connections routed over the network. One form of capacity allocation issue arises in networks where some of the traffic has to be routed on paths with specified bounds on their lengths. These allocation issues arise in both packet networks and optical networks.

Path-length bounds are an important constraint for wavelength routing in optical networks because the optical signal attenuates as it traverses fiber links, which is desirably accounted for when routing the connection. Optical signal attenuation is a function of the type of fiber as well as the wavelength of the optical signal. As the optical signal traverses a link, it is typically amplified periodically using an In-Line Optical Amplifier, also referred to as the 1R (re-amplification) function. Amplification boosts the optical signal. When the optical signal traverses longer distances, it may be regenerated using an Optical-Electrical-Optical regenerator, also referred to as the 3R (retime, reshape, re-amplify) function. The optical regenerators are expensive components in an optical network. Thus, to minimize regeneration of the optical signal, the length of the physical path traversed by the optical signal is desirably kept to a minimum, forming a path-length constraint for the paths traversed by the signal.

Path-length constraints in packet networks usually arise as restrictions on the number of hops in the path traversed by the packet. Each time a router processes a packet, the router introduces delay and jitter. As the length of the path increases, delay and jitter increases.

Path-length constraints may also be employed to model routing when link error rates are known and the path(s) for a connection desirably meet certain error rate constraints. For example, if link loss rates are known, path-length constraints are used to ensure that the path loss for a given connection is within some predetermined value. In addition, path-length constraints may be employed to route connections with link preferences taken into account. In general, such modeling associates an auxiliary preference "cost" for each link, and the connections are then routed on paths that not only meet specified length constraints but also meet constraints on the preference cost.

SUMMARY OF THE INVENTION

In accordance with embodiments of the present invention, capacity design of an optical network with path-length routing constraints for connections employs a linear programming sizing problem for an optimal routing of demands associated with the connections. The optical network is modeled as a graph of edges and vertices corresponding to the links and nodes of the optical network. A dual of the linear programming sizing problem may be formed, and may be solved using an approximation algorithm. First, edge weights are initialized to a small number based on i) the inverse of the edge's capacity and ii) a scalar constant. Then, the approximation algorithm proceeds in phases. In each phase, the demand for each commodity is routed over the edges of the graph. During each phase, the demand's flow is sent from the source to the destination via multiple iterations. During each iteration, the optimal shortest bounded-length path from the source to the destination is determined. The actual amount of flow sent during an iteration is the lesser of the capacity of the minimum-capacity edge and the remaining amount of flow to make up the demand of the current phase. Once the actual amount of flow is sent for the iteration, the weights of the edges that carry the flow are updated. The last iteration ends when the entire flow of the demand is routed. After the last phase, the value employed to scale the network demands or link capacity is generated from the maximum ratio of edge flow to edge capacity.

In accordance some exemplary embodiments of the present invention, demands of a plurality of connections transferring data through a network of nodes connected by links are allocated. Allocation initializes a weight of each link based on a capacity of the link and routes a demand for a current connection. The demand of each connection is routed by 1) generating a minimum path weight for paths through nodes and links of the network for the current connection, wherein the minimum path weight is the least sum of link weights for links of each length-bounded path between a source node and a destination node of the current connection, 2) determining an optimal length-bounded path through nodes and links of the network for the current connection based on the minimum path weight, 3) routing a portion of a remainder of the demand as one or more flows over the length-bounded path, wherein the portion is based on a lesser value of the remainder of the demand and a minimum capacity of links in the length-bounded path, 4) updating i) the link weight of each link based on the routed portion and a capacity of the link and ii) the remainder of the demand, and 5) repeating (1)-(5) until the demand is routed. A scaling value is generated based on a maximum ratio of a flow over a link and a capacity of the link.

In accordance with some exemplary embodiments of the present invention, link capacity for a plurality of connections transferring data through a network is allocated by generating a graph of the network, wherein the network includes a plurality of nodes interconnected by a plurality of links. A linear programming problem is formed based on the plurality of connections, wherein i) each connection defines a length-bounded path for a demand and ii) the linear programming problem tends to maximize a first objective function based on a first set of constraints. A dual of the linear programming problem is formed, wherein the dual tends to minimize a second objective function based on a second set of constraints. The dual is solved to generate a scaling factor and routing of the length-bounded path for each of the plurality of connections.

BRIEF DESCRIPTION OF THE DRAWINGS

Other aspects, features, and advantages of the present invention will become more fully apparent from the following detailed description, the appended claims, and the accompanying drawings in which:

FIG. 1 shows an exemplary method of length-bounded capacity allocation in accordance with an exemplary embodiment of the present invention.

DETAILED DESCRIPTION

The following definitions may aid in an understanding of the present invention. An optical network of nodes and links may be modeled as a directed graph $G(V,E)$, where $V$ is a set of vertices representing the nodes of the network (e.g., optical switches) and $E$ is a set of edges representing the (e.g., optical) links connecting the nodes. Associated with each edge $e$ is an associated capacity $c(e)$ of the edge, an associated length $l(e)$ of the edge, and optionally an associated cost $b(e)$ of the edge for routing a unit flow over the edge. The capacity of an edge may be, for example, the available bandwidth of the corresponding link. The length of an edge may be a number representing the physical length of the corresponding link or a logical hop length. The cost of an edge may be a value that represents an assessed cost for routing a flow over the corresponding link.

One or more connections are routed between K source-destination node pairs, where each of the source-destination node pairs is termed a "commodity." The terms $s(k)$ and $t(k)$ denote the source node and destination node for the kth commodity, respectively, and the term $d(k)$ denotes the corresponding demand for the kth commodity. Thus, for the kth commodity, $d(k)$ units of flow are to be routed between $s(k)$ and $t(k)$. A scalar value $\lambda$ may be defined as a scaling factor to scale either demands of connections or capacities of edges in the network. The given demand between a given source-destination node pair may be routed as a flow over one or more distinct paths through the network. While a physical network may provide for bi-directional communication between source-destination node pairs, the present invention is described herein for flows routed over uni-directional edges.

The set $P_L^k$ is the set of j disjoint paths between $s(k)$ and $t(k)$ whose length is not greater than L, and P denotes a path in the set $P_L^k$. One or more flows $x(P)$ are associated with path P, and since P denotes a collection of links, there will be a flow of $x(P)$ for each edge $e \in P$. The variable $l(P)$ is the sum of the edge lengths $l(e)$ in path P, and the variable $b(P)$ is the sum of the edge costs $b(e)$ in path P (i.e., the cost of routing a unit of flow over the path P) The bound B represents an upper bound on the cost of routing a flow.

Capacity design in accordance with embodiments of the present invention seeks an optimal routing for connections over a network given path length, weight, and optional cost constraints associated with the connections. Embodiments of the present invention may be employed for capacity allocation for the following cases: i) a length-constrained maximum flow (LCMF) problem, ii) a capacity allocation with bounded path lengths (CBPL) problem, and iii) a budget-constrained, bounded-length capacity allocation (BCBL) problem.

The LCMF problem determines a maximum flow that may be routed from a given source to a given destination on length-bounded paths (i.e., paths whose maximum sum of edge lengths are less than or equal to a bound L) without violating capacity constraints of the links. The CBPL problem routes demands of K source-destination pairs through length-bounded paths of a given network (represented by a network graph $G(V,E)$) without violating capacity constraints of the network links. The LCMF problem is a special case of the CBPL problem with a single source-destination pair (i.e., K=1). Similarly, the BCBL problem routes demands of K source-destination pairs through length-bounded paths of a given network without violating capacity and cost constraints.

In accordance with a first exemplary embodiment of the present invention, a length-bounded capacity allocation method forms a linear programming problem corresponding to the CBPL problem. The method of length-bounded capacity allocation forms a sizing problem that is a generalization of a maximum concurrent flow-problem. If $P \in P_L^k$ then the sizing problem is formulated as a maximization of an objective function $\lambda$ subject to the constraints of equations (1), (2), and (3) as follows:

$$\lambda^* = \max \lambda \text{ subject to:} \quad (1)$$
$$\sum_k \sum_{P \in P_L^k; e \in P} x(P) \leq u(e) \ \forall \, e \in E,$$

$$\sum_{P \in P_L^k} x(P) = \lambda d(k) \ \forall \, k, \text{ and} \quad (2)$$

$$x(P) \geq 0 \ \forall \, P \in P_L^k, \forall \, k \quad (3)$$

where "max" is the mathematical term for "maximize" the objective function "$\lambda$". The constraint of equation (1) sums all flows sent on a given edge e, and this sum has to be less than the capacity $u(e)$ of the link. The constraint of equation (2) ensures that a flow of $\lambda d(k)$ is sent for commodity k; where $\lambda$ is the scalar that the objective function seeks to maximize. The constraint of equation (3) ensures that the flows over the edges are positive.

If $\lambda^*$ represents the maximum value of $\lambda$ and if $\lambda^* \geq 1$, then the given demands $d(k)$ may be routed on the network and the routing may be determined through the solution of the above sizing problem. If the value of $\lambda^* < 1$, then all the current demands $d(k)$ might not necessarily be routed on the network.

However, if the value of $\lambda^* < 1$, then the demands might be scaled by $\lambda^*$ (since $\lambda^* < 1$, the demands $d(k)$ are scaled down) and new demands may be accommodated in the network. Alternatively, the capacity of all links in the network might be scaled by $(1/\lambda^*)$ (i.e., the capacity of the network's links is increased). The given demands $d(k)$ may then be routed on this larger capacity network.

Preferred embodiments of the present invention employ a primal dual approach to form an indirect solution for the above linear programming problem. The dual to the linear programming sizing problem above is as follows. The dual sizing problem assigns a weight $w(e)$ to each edge e of the graph $G(V,E)$. The weight $w(P)$ of a path pair $P \in P_L^k$ is defined as the sum of the weights of the edges of the length-bounded path pair P, where the weights are determined as described subsequently. A dual sizing problem variable $z(k)$ (the dual of the objective function $\lambda$) is associated with commodity k. The variable $z(k)$ is weight of the length-bounded path between $s(k)$ and $t(k)$ having the least sum of edge weights, which may be defined as given in equation (4):

$$z(k) = \min_{P \in P_L^k} w(P) \qquad (4)$$

The dual sizing problem is formulated as a minimization of $z(k)$ subject to the constraints of equations (5), (6), and (7) as follows:

$$\min \sum_{e \in K} u(c)w(c) \text{ subject to:} \qquad (5)$$

$$\sum_{e \in P} w(e) \geq z(k) \;\; \forall P \in P_L^k, \forall k$$

$$\sum_{k=1}^{K} d(k)z(k) \geq 1 \qquad (6)$$

$$w(e) \geq 0 \;\; \forall e \in E \qquad (7)$$

where equation (5) ensures that $z(k)$ is the minimum path length, equation (6) ensures that all demands are routed, and equation (7) ensures that all edge weights are non-negative. Equivalently, the formulation of the dual linear programming problem seeks a set W of weights $w(e)$ such that relation of equation (8) is minimized:

$$\frac{\sum_{e \in E} w(e)u(e)}{\sum_k d(k)z(k)} . \qquad (8)$$

Solution of the dual sizing problem might employ an $\epsilon$-approximation algorithm. The $\epsilon$-approximate optimal solution has a value at least $(1-\epsilon)$ times the optimal solution. Consequently, $\epsilon$ may be arbitrarily selected as a relatively small number.

A summary of the operation of the $\epsilon$-approximation algorithm is as follows. First, the edge weights $w(e)$ are initialized to a small number based on i) the inverse of the edge's capacity and ii) a scalar constant $\delta$, where $\delta$ is related to $\epsilon$. Then, the approximation algorithm proceeds in phases. In each phase, for each commodity k, $d(k)$ units of flow are routed from $s(k)$ to $t(k)$ over the edges of the graph $G(V,E)$. A phase ends when the last commodity K is routed. During each phase, the $d(k)$ units of flow from $s(k)$ to $t(k)$ for commodity k are sent from $s(k)$ to $t(k)$ via multiple iterations.

During each iteration, the length-constrained, lightest path (LCLP) from $s(k)$ to $t(k)$ is determined. The LCLP is the minimum-weighted path through the network whose length does not exceed L. The LCLP is the shortest, length-bounded path P* in graph $G(V,E)$ from $s(k)$ and $t(k)$, and P* is determined using a weighted, shortest-path algorithm that may be based on, for example, the well-known Dijkstra's algorithm, such as described in E. Dijkstra, "A Note: Two Problems In Connection With Graphs," Numerical Mathematics, vol. 1, 1959, pp. 269-271, which is incorporated herein by reference. Embodiments of the present invention may employ either the well-known Lorenz-Raz algorithm for physical length-bounded paths or the well-known Bellman-Ford algorithm if the bound on length is a bound on the number of hops in the paths.

The variable u represents the minimum-capacity edge on this optimal shortest path P* from $s(k)$ to $t(k)$ (u also represents the amount of capacity of the minimum-capacity edge), and at most u units may be sent during an iteration. Since $d(k)$ units of flow are desirably sent for commodity k in each phase, the actual amount of flow over the LCLP that is sent during an iteration is the lesser of the minimum link capacity and u and the remaining amount of flow to make up $d(k)$ of the current phase. The edge weights are then adjusted for the edges on this LCLP. If $r_{i,k}^s$ represents the remaining amount of flow to be sent in steps (s+1, s+2, ...) in phase i for commodity k, then $d(k)$ units of flow are routed $$r_{i,k}^0 = d(k)$$

for all phases i. Let $$w_{i,k}^{s-1}$$

represent the link weights at the beginning of step s of phase i of commodity k. In this step we determine $$\alpha_{i,k}^s = \min_{P \in P_L^k} w(P) \qquad (9)$$

where the weight function is $$l_{i,k}^{s-1} .$$

The path P* is the LCLP (i.e., optimal path) returned by, for example, the Lorenz-Raz algorithm, and $u_{min}$ is the edge in P* with the lowest capacity. A flow of $$f_{i,k}^s = \Delta = \min\{u, r_{i,k}^{s-1}\}$$

is routed, and the remaining flow is updated as $$r_{i,k}^s = r_{i,k}^{s-1} - f_{i,k}^s.$$

The edge weights for those edges carrying flow of the current demand are updated as in equation (10):

$$w(e) = w(e)\left(1 + \frac{\varepsilon\Delta}{u(e)}\right) \ \forall\, e \in P^*. \quad (10)$$

For an ε-approximation algorithm, the value of ε is generally selected as a relatively small number related to the ratio of the solutions to the primal and dual programming problems. The last iteration ends when the d(k) units of flow are routed.

Therefore, the ε-approximation algorithm alternates between sending flow along optimal shortest bounded-length paths and adjusting the weights of the edges along which the flow has been sent for each phase, and repeats the process until the (ε-approximate) optimal solution is reached. Increasing the number of phases increases the "closeness" of the ε-approximation (i.e, the near optimal solution) to the (mathematically) optimal solution. If $$D(w) = \sum_{e \in E} w(e)u(e),$$

then the algorithm may terminate at the end of the phase when the value of D(w)>1. Since w(e) is updated based on ε, decreasing ε implies more phases are required to make D(w) >1. When the algorithm terminates, the value for λ=λ* may be generated, and the LCLP path for each of the K commodities is the path for routing the demand of the commodity (i.e., the demand of the corresponding connection).

FIG. 1 shows a first exemplary method of solving the dual sizing problem for length-bounded capacity allocation employing an ε-approximation algorithm. At step 101, an associated weight w(e) of each edge e is initialized with an initial weight of $$\frac{\delta}{u(e)}.$$

The value of δ is related to ε, as described subsequently, and u(e) is the total available capacity (not residual capacity) of edge e. Also, at step 101, the counter value c is set to 0. As the method progresses, c is updated to count the number of phases completed by the method.

At step 102, a test determines whether d is less than 1, where d is $$D(w) = \sum_{e \in E} w(e)u(e).$$

The variable d is set and the test of step 102 determines whether, after the previous phase has completed, the current solution of the ε-approximation meets a predefined criterion for a near optimal solution to the dual sizing problem. If the test of step 102 determines that d>1, then the method advances to step 111, where the process of computing final output values begins. If the test of step 102 determines that d<1, then another phase (c+1) is desired and the method advances to step 103.

At step 103, the value of k is set to 1, and flow variable r is set to the first commodity's demand d(1). At step 104, the method checks whether k>K, indicating that all K commodities have been routed for the current pass (c). If the test of step 104 determines that k>K, then the method advances to step 110. At step 110, the counter value c is incremented by 1, d is updated, and the method returns to step 102. If the test of step 104 determines that k≦K, then the method advances to step 105.

At step 105, a test determines whether r>0. If the test of step 105 determines that r is less than or equal to 0, then the current demand d(k) has been routed, and the method advances to step 106. At step 106, k is incremented by 1 to point to the next commodity, r is set to next commodity's demand, and the method returns to step 104 to route the next commodity's demand. If the test of step 105 determines that r>0, then not all of the current commodity's demand has been routed, and the method advances to step 107.

At step 107, the minimum-length variable z is set to the minimum path weight w(P) of each path P in $P_L^k$, where the path weight w(P) is defined as the sum of the weights of the edges in a given path P. At step 108, the LCLP (optimal shortest path) P* is generated for this length z, such as by the Lorenz-Raz or Bellman-Ford algorithms, and the minimum-capacity edge variable u is set as the capacity of the edge in P* having the least value (i.e., min u(e), where e∈P*).

At step 109, a portion Δ of the demand d(k) is routed. The portion Δ of demand is set as the minimum value between r and u. The variable r is updated to (r−Δ), the flows on the edges in P* that carry the flows are updated (i.e., f(e) gets f(e)+Δ), and the weights of the edges that carry the flow are updated. In step 109, the ε-approximation updates the weights w(e), e∈P*, as w(e)(1+(εΔ/u(e)). Thus, the weight of each edge (i.e., the weighting of the links) in a given pass is related to the amount of flow routed over the edge during the phase. At the next phase, the method tends to avoid routing over edges (links) having their weights increased during the previous pass as a result of the LCLP computation's penalty of higher weighted edges. From step 109, the method returns to step 105 to route the next portion of the demand d(k).

If the test of step 102 determines that d>1, then a near optimal solution has been reached and the method advances to step 111. At step 111, the value of λ* is calculated, which may be employed to scale the demands, or inversely scale the edge capacities, of the network. First, the variable ρ is set to the maximum value of (f(e)/u(e)) for all e∈E. Next, the value of λ* is set as (c−1)/ρ. This normalization by (c−1) occurs because all the flows d(k) are routed on every phase, and c is decremented by 1 to account for incrementing c at the end of the previous phase.

The value of ε may be a relatively small number appropriately selected arbitrarily depending on how "close" the ε-approximation solution should be relative to the exact solution. The ε-approximation solution is approximately (1+2ε) times the exact solution. The values of ε and δ may be related. For example, equation (11) gives an exemplary relation for ε and δ.

$$\delta = m^{-\frac{1}{\varepsilon}}(1-\varepsilon)^{\frac{1}{\varepsilon}}, \quad (11)$$

where m is the number of links in the network. The running time of a particular implementation of the algorithm increases with the accuracy needed (i.e., the running time increases as $\varepsilon$ decreases).

The following pseudo-code implements the method of FIG. 1 for the first exemplary embodiment of the present invention for a method of length-bounded capacity allocation.

```
100:    w(e) = δ/u(e)    ∀ e ∈ E  and  c = 0
101:    While d < 1
102:        For k = 1,2,..., K
103:            r = d(k)
104:            While r > 0
105:                z = min_{P∈P_L^k} w(P)
106:                Let P* be the LCLP (optimal path) in P_L^k
107:                Let u = min_{e∈P*} u(e)
108:                Δ = min {r,u}
109:                r ← r - Δ
110:                f(e) ← f(e) + Δ
111:                w(e) ← w(e)(1 + εΔ/u(e))    ∀ e ∈ P*
112:            end While
113:        end For
114:        c ← c + 1
115:    end While
116:    ρ = max_{e∈E} f(e)/u(e)
117:    λ* = (c-1)/ρ
```

A second exemplary embodiment of the present invention accounts for associated costs of edges during length-bounded capacity allocation. Consequently, the second exemplary embodiment of the present invention may generate a solution for the BCBL problem to route demands of K source-destination pairs through length-bounded paths of a given network without violating capacity and cost constraints. As in the first exemplary embodiment that generates a solution for the CBPL problem, a linear programming problem is formed so that the demands are scaled by some factor λ and the objective is to maximize this scaling factor subject to the constraints that edge capacities and the budget constraint are not violated.

If λ*(B) represents the maximum scaling factor for a given budget constraint B, and if λ*(B)≧1, then the current demands may be routed through the network without violating capacity and budget constraints. The relation λ*(B)<1 implies that the current demands cannot be routed without violating capacity and budget constraints. The objective of the linear programming problem is to determine a routing that minimizes the total cost. A budget B* may be found such that λ*(B*)=1. The bound B* is the minimum cost to route the K demands. Therefore, this minimum-cost, routing problem with path-length constraints may be solved by employing an algorithm that solves the CBPL problem if edge costs are also updated when edge weights are updated. The algorithm for computing a solution that is within (1+ε) of the optimal solution to BCBL, similar to the ε-approximation algorithm for CBPL.

The modification to the ε-approximation to the CBPL linear programming problem (and its dual) is that, in each iteration of the algorithm, the (dual) weight w'(e) of the link is modified to account for the budget constraints. Associated with the budget constraint is the dual multiplier φ that is related to edge cost and the cost bound B. The weight of an edge is augmented by the product of the cost of the link and the multiplier φ. If the total cost is defined as the cost of the path times the flow routed over the path, then, to account for total cost to be less than the budget, the flow itself must be scaled when the portion of flow to be routed exceeds the budget. Once the flow is routed, the weights and cost multiplier are updated.

The following pseudo-code implements an ε-approximation algorithm for the second exemplary embodiment of the present invention for a method of length-bounded capacity allocation with a budget constraint (i.e., a BCBL problem with length bound L and cost bound B). For the following pseudo-code, b(P*) is the cost of the LCLP, which is the sum of the edge costs b(e) for edges included in P*.

```
100:    w'(e) = δ/u(e)    ∀ e ∈ E;   φ = δ/B   and  c = 0
101:    While d < 1
102:        For k = 1,2,..., K
103:            r = d(k)
104:            While r > 0
105:                w(e)=w'(e)+φb(e)  ∀e∈E
106:                z = min_{P∈P_L^k} w(P)
107:                Let P* be the LCLP (optimal path) in P_L^k
108:                Let u = min_{e∈P*} u(e)
109:                Δ = min {r,u}
110:                r ← r - Δ
111:                If b(P*)Δ > B, then Δ ← B/b(P*)
112:                f(e) ← f(e) + Δ
113:                w'(e) ← w'(e)(1 + εΔ/u(e))    ∀ e ∈ P*
114:                φ ← φ(1 + εΔb(P*)/B)
115:            end While
116:        end For
117:        c ← c + 1
118:    end While
119:    ρ = max_{e∈E} f(e)/u(e)
120:    λ* = (c-1)/ρ
```

While embodiments of the present invention are described herein for optical networks of optical switches connected by optical links, the present invention is not so limited. The present invention may be extended to any communications network, such as MPLS or similar packet networks, that may route connections over a network of nodes and links between source-destination pairs. In addition, the present invention is not limited to optical networks, but may also be employed with electrical or electrical/optical hybrid networks.

While the exemplary embodiments of the present invention are described with respect to various equations, the present invention is not limited to the form of these equations. One skilled in the art may modify these equations by scaling, or may form different approximate solutions to the linear programming problems described herein employing any of a number of techniques well known in the art.

The present invention may be embodied in a processor, such as a network controller or computer, and the processor may be coupled to a network or network database to receive network topology, provisioning, and capacity information used by the methods as described herein.

Network capacity design in accordance with one or more embodiments of the present invention may provide for the advantages of more efficient utilization of network service-level capacity, reducing congestion of optical switches at network nodes, and higher data throughput of the network.

As would be apparent to one skilled in the art, the various functions of capacity design for restorable connections may be implemented with circuit elements or may also be implemented in the digital domain as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of allocating demands of a plurality of connections transferring data through a network of nodes connected by links, the method comprising the steps of:
   (a) initializing a weight of each link based on a capacity of the link;
   (b) routing a demand for a current connection by the steps of:
   (b1) generating a minimum path weight for paths through nodes and links of the network for the current connection, wherein the minimum path weight is the least sum of link weights for links of each length-bounded path between a source node and a destination node of the current connection,
   (b2) determining an optimal length-bounded path through nodes and links of the network for the current connection based on the minimum path weight,
   (b3) routing a portion of a remainder of the demand as one or more flows over the length-bounded path, wherein the portion is based on a lesser value of the remainder of the demand and a minimum capacity of links in the length-bounded path,
   (b4) updating i) the link weight of each link based on the routed portion and a capacity of the link and ii) the remainder of the demand, and
   (b5) repeating steps (b1)-(b4) until the demand is routed;
   (d) repeating step (b) for each of the plurality of connections;
   (e) solving a linear programming problem having primal and dual sets of constraints to generate a scaling value based on a maximum ratio of a flow over a link and a capacity of the link; and
   (f) scaling, based on the scaling value, either i) each capacity of the plurality of links or ii) each demand of the plurality of connections.

2. The invention of claim 1, further comprising the step of routing each connection based on the corresponding optimal length-bounded path.

3. The invention of claim 1, further comprising the steps of generating a metric for the updated link weights and repeating steps (b) through (d) based on the metric.

4. The invention of claim 3, wherein the metric is based on the sum of the products of each edge weight and edge capacity.

5. The invention of claim 1, wherein the method generates an $\epsilon$-approximation based on a constant $\epsilon$, for step (b4), the link weight is updated based on a combination of $\epsilon$ and the portion.

6. The invention of claim 1, wherein the method further comprises the step of:
   (a1) initializing a cost multiplier of each link based on a cost bound; and
   wherein step (b1) further comprises the step of:
   (b1i) setting a current weight of each link based on A) the previous weight of the link and B) a combination of the cost multiplier and a cost of the link;
   wherein, for step (b3), the portion is adjusted, prior to routing, to account for a cost of the optimal length-bounded link, and the cost bound; and
   wherein step (b4) further comprises the step of:
   (b4i) updating i) the cost multiplier based on a combination of the routed portion, the cost of the optimal length-bounded link, and the cost bound.

7. The invention of claim 1, wherein, for step (a), the network is an optical network, each node is an optical switch, and each link is an optical link.

8. A method of allocating link capacity for a plurality of connections transferring data through a network, the method comprising the steps of:
   (a) generating a graph of the network, wherein the network includes a plurality of nodes interconnected by a plurality of links;
   (b) forming a linear programming problem based on the plurality of connections, wherein i) each connection defines a length-bounded path for a demand and ii) the linear programming problem tends to maximize a first objective function based on a first set of constraints;

(c) forming a dual of the linear programming problem, wherein the dual tends to minimize a second objective function based on a second set of constraints;

(d) solving the dual to generate a scaling factor and routing of the length-bounded path for each of the plurality of connections;

(e) scaling, based on the scaling factor, either i) each capacity of the plurality of links or ii) each demand of the plurality of connections; and (f) routing data of at least one of the plurality of connections over a corresponding active path, wherein:

each link has a weight, and each path has a weight;

the linear programming problem maximizes the scaling factor as the first objective function;

the first set of constraints are A) a sum of all flows on each link is less than the link's capacity, B) each demand as a function of the scaling factor is routed through the network, and C) each flow over a link is non-negative;

the dual minimizes a shortest length-bounded path weight for each of the plurality of connections;

the second set of constraints are D) a sum of all link weights is less than the minimum shortest path weight, E) each demand as a function of the minimum path weight is routed through the network, and F) each link weight is non-negative.

9. The invention of claim 8, wherein, for step (a), the network is an optical network, each node is an optical switch, and each link is an optical link.

10. The invention of claim 8, wherein, for step (b), the linear programming problem is a capacity allocation with bounded-path lengths problem.

11. The invention of claim 8, wherein, for step (b), the linear programming problem is a capacity allocation with budget-constrained, bounded-path lengths problem.

12. A computer-readable medium having stored thereon a plurality of instructions, the plurality of instructions including instructions which, when executed by a processor, cause the processor to implement a method for allocating demands of a plurality of connections transferring data through a network of nodes connected by a plurality of links, the method comprising the steps of:

(a) initializing a weight of each link based on a capacity of the link;

(b) routing a demand for a current connection by the steps of:

(b1) generating a minimum path weight for paths through nodes and links of the network for the current connection, wherein the minimum path weight is the least sum of link weights for links of each length-bounded path between a source node and a destination node of the current connection, (b2) determining an optimal length-bounded path through nodes and links of the network for the current connection based on the minimum path weight, (b3) routing a portion of a remainder of the demand as one or more flows over the length-bounded path, wherein the portion is based on a lesser value of the remainder of the demand and a minimum capacity of links in the length-bounded path, (b4) updating i) the link weight of each link based on the routed portion and a capacity of the link and ii) the remainder of the demand, and (b5) repeating steps (b1)-(b4) until the demand is routed;

(d) repeating step (b) for each of the plurality of connections;

(e) solving a linear programming problem having primal and dual sets of constraints to generate a scaling value based on a maximum ratio of a flow over a link and a capacity of the link; and (f) scaling, based on the scaling value, either i) each capacity of the plurality of links or ii) each demand of the plurality of connections.

13. A computer-readable medium having stored thereon a plurality of instructions, the plurality of instructions including instructions which, when executed by a processor, cause the processor to implement a method for allocating link capacity through a network, the method comprising the steps of:

(a) generating a graph of the network, wherein the network includes a plurality of nodes interconnected by a plurality of links, with a plurality of connections transferring data through the network of nodes;

(b) forming a linear programming problem based on the plurality of connections, wherein i) each connection defines a length-bounded path for a demand and ii) the linear programming problem tends to maximize a first objective function based on a first set of constraints;

(c) forming a dual of the linear programming problem, wherein the dual tends to minimize a second objective function based on a second set of constraints;

(d) solving the dual to generate a scaling factor and routing of the length-bounded path for each of the plurality of connections;

(e) scaling, based on the scaling factor, either i) each capacity of the plurality of links or ii) each demand of the plurality of connections; and (f) routing data of at least one of the plurality of connections over a corresponding active path, wherein:

each link has a weight, and each path has a weight;

the linear programming problem maximizes the scaling factor as the first objective function;

the first set of constraints are A) a sum of all flows on each link is less than the link's capacity, B) each demand as a function of the scaling factor is routed through the network, and C) each flow over a link is non-negative;

the dual minimizes a shortest length-bounded path weight for each of the plurality of connections;

the second set of constraints are D) a sum of all link weights is less than the minimum shortest path weight, E) each demand as a function of the minimum path weight is routed through the network, and F) each link weight is non-negative.

* * * * *

UNITED STATES PATENT AND TRADEMARK OFFICE
CERTIFICATE OF CORRECTION

PATENT NO. : 7,633,867 B2 Page 1 of 1
APPLICATION NO. : 10/357557
DATED : December 15, 2009
INVENTOR(S) : Kodialam et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2076 days.

Signed and Sealed this

Twenty-first Day of December, 2010

David J. Kappos
*Director of the United States Patent and Trademark Office*